United States Patent

Oppelt et al.

[11] Patent Number: 6,005,908
[45] Date of Patent: Dec. 21, 1999

[54] X-RAY COMPUTED TOMOGRAPHY APPARATUS WITH RADIATION DETECTOR WHICH REDUCES IMAGE UNSHARPNESS

[75] Inventors: Arnulf Oppelt, Spardorf; Karl Stierstorfer, Erlangen, both of Germany

[73] Assignee: Siemens Aktiengesellschaft, Munich, Germany

[21] Appl. No.: 09/046,768

[22] Filed: Mar. 24, 1998

[30] Foreign Application Priority Data

Apr. 9, 1997 [DE] Germany .............. 197 14 689

[51] Int. Cl.⁶ .......................................... A61B 6/00
[52] U.S. Cl. .................. 378/19; 378/14; 378/11
[58] Field of Search .................. 378/19, 4, 14, 378/11, 98.8

[56] References Cited

U.S. PATENT DOCUMENTS

| | | | |
|---|---|---|---|
| 4,872,188 | 10/1989 | Lauro et al. | 378/62 |
| 5,528,043 | 6/1996 | Spivey et al. | 250/370.09 |
| 5,587,591 | 12/1996 | Kingsley et al. | |
| 5,818,898 | 10/1998 | Tsukamoto et al. | 378/98.8 |

FOREIGN PATENT DOCUMENTS

PS 44 20 603   6/1995   Germany .
OS 195 24 858   of 1997   Germany .

*Primary Examiner*—David P. Porta
*Assistant Examiner*—Michael J. Schwartz
*Attorney, Agent, or Firm*—Hill & Simpson

[57] ABSTRACT

An X-ray computed tomography apparatus has a radiation detector composed of X-ray converters so that the scattering of light in a scintillator or the inductive disturbance in a directly converting semiconductor is minimized or eliminated. Each X-ray converter, e.g. a scintillator is in fixed contact with a number of signal converters, e.g. photodiodes. From the output signals of the signal converters, the unsharpness can be calculated and then compensated.

7 Claims, 2 Drawing Sheets

X-RAY COMPUTED TOMOGRAPHY APPARATUS WITH RADIATION DETECTOR WHICH REDUCES IMAGE UNSHARPNESS

BACKGROUND OF THE INVENTION

1. Field of the Invention

The present invention is directed to an X-ray computed tomography apparatus of the type having a radiation detector composed of a row of detector elements.

2. Description of the Prior Art

In X-ray technology, it is known to employ X-ray detectors in which a scintillator converts X-rays incident thereon into visible light, this light then being converted by a photoelectrical converter into an electrical signal. An image of the examined subject can be created from the signals, for example. The positional resolution is generally not exact, since the optical propagation of the light with the scintillator leads to unsharpnesses. For example, if an X-ray quantum is incident at a point on the front of the scintillator, a smearing of the edges of this point can occur at the back of the scintillator (at which the light emerges) due to propagation of the light through the scintillator.

In digital radiography it is known to allocate a number of photoelectric converters as X-ray converters to a scintillation crystal in order to create corresponding electrical image signals. A desired image resolution is thereby achieved (U.S. Pat. No. 5,587,591; Nuclear Instruments and Methods in Physics Research, A 310, 1991, pages 471 to 474; German OS 195 24 858 A1; German PS 44 20 603). These known X-ray converters are not usable in computed tomography.

SUMMARY OF THE INVENTION

An object of the present invention is to provide an X-ray computed tomography apparatus having an X-ray detector which achieves an image resolution compared to conventional systems.

The above object is achieved in accordance with the principles of the present invention in an X-ray computed tomography apparatus having a radiation detector composed of a row of detector elements, each detector element including an X-ray converter, such as a scintillator, in fixed contact with multiple signal converters, such as photodiodes. By having multiple signal converters associated with each individual X-ray converter, a calculation can be made identifying the unsharpness associated with the overall detector, and this unsharpness can then be eliminated or minimized.

By contrast to known detectors, the radiation detector of the invention is suited for use in computed tomography, as well as for use for detecting hard radiation, which has heretofore necessitated the use of thick scintillators, and for use in a relatively small detector with only a few rows of columns of individual detectors. Conventional filtering techniques, such as unsharp masking (subtracting the smooth and weighted image from the original image to enhance high frequencies) generally fail for pixels close to the image boundary. Such boundary pixels, however, can be a majority of pixels in computed tomography applications.

In a further embodiment of the invention, each detector element is composed of directly converting semiconductor material with a number of pixel contacts at a rear face thereof, each pixel contact, for the single pixel represented by the detector, producing an electrical output signal, the output signals being used to calculate the unsharpness as described above.

DESCRIPTION OF THE PREFERRED EMBODIMENTS

Figure 1:
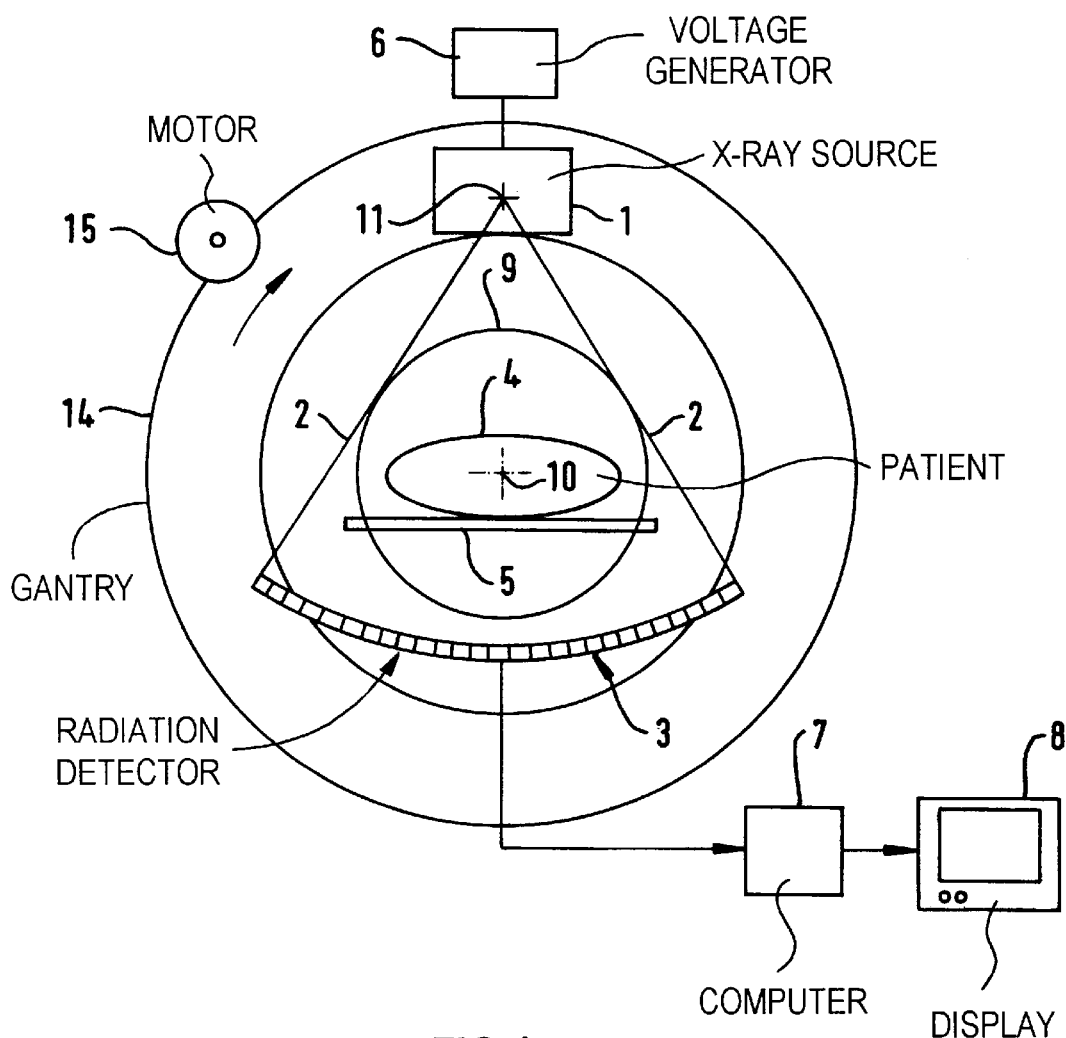
FIG. 1 shows the basic components of an X-ray computed tomography apparatus with an X-ray detector constructed in accordance with the principles of the present invention.

The computed tomography apparatus illustrated in FIG. 1 has a measuring unit composed of an X-ray source 1, which emits a fan-shaped X-ray beam, and a detector 3, which is a row of individual detectors, e.g. 512 individual detectors. The X-ray source 1 has a focus 11. The subject 4 lies on a patient bed 5. The measuring unit composed of the X-ray source 1 and the detector 3 is mounted on a rotatable gantry 14 driven by a motor 15. For scanning of the patient 4, the measuring unit is rotated through 360° around a measuring field 9 in which the patient 4 is lying. The axis of rotation is designated 10. During this operation, the X-ray source 1, which is powered by a voltage generator 6, is pulsed or driven with continuous radiation. At predetermined angle positions of the measuring unit, datasets are created which are delivered by the detector 3 to a computer 7, which calculates the attenuation coefficients of predetermined image points from the datasets and reproduces them visually on a display 8. Accordingly, an image of the irradiated slice of the patient appears on the display 8.

Figure 2:
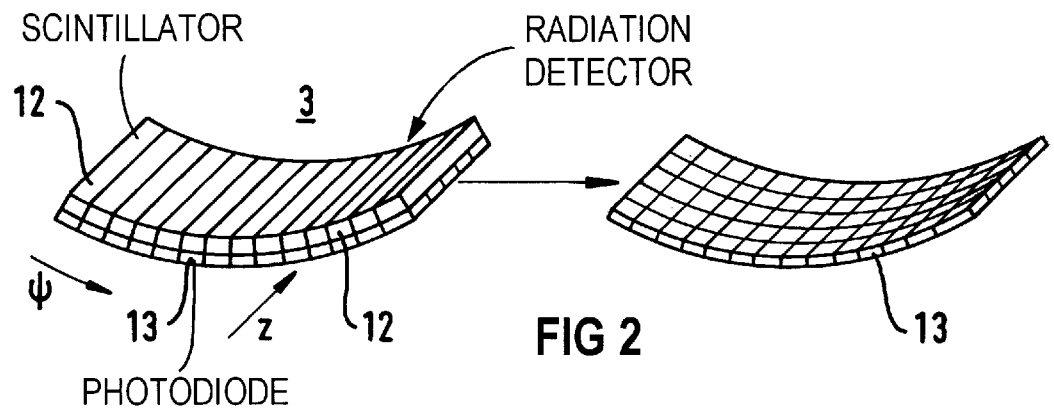
FIGS. 2 through 5 respectively show different embodiment versions of the X-ray detector of the computed tomography apparatus of FIG. 1.

FIG. 2 shows that the detector 3 is formed by a row of scintillators 12 with which a photodiode layer 13 is in fixed optical contact. The photodiode layer 13 is shown in FIG. 2 on the right side. It follows therefrom, that, viewed in the direction of the radiation, there is a row of photodiodes behind every scintillator 12. In the exemplifying embodiment according to FIG. 2, in the z-direction; i.e., in the direction of the axis of rotation 10, the detector 3 is unstructured. In the φ-direction, however, it is structured.

Figure 3:
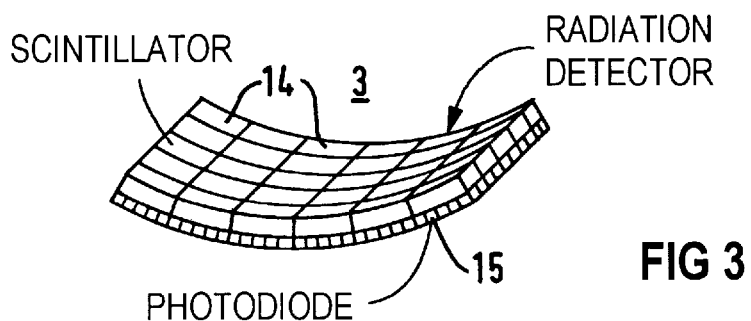

In the exemplifying embodiment according to FIG. 3, the detector 3 is composed of a matrix of scintillators 14. A matrix of photodiodes 15 lies in optical contact behind every scintillator 14.

Figure 4:
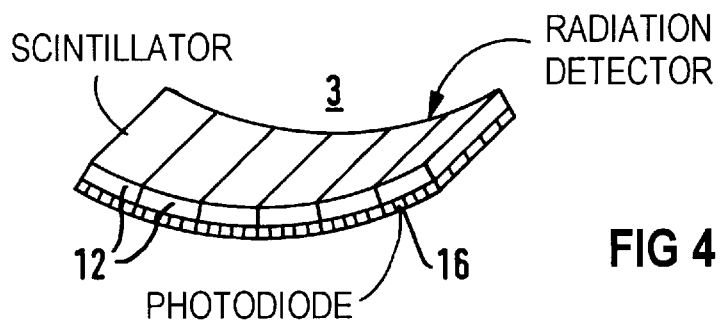

In the exemplifying embodiment according to FIG. 4, the structuring of the detector 3 in regard to the scintillator 12 corresponds to the structuring according to FIG. 2. Behind every scintillator 12 lies a matrix of photodiodes 16.

Figure 5:
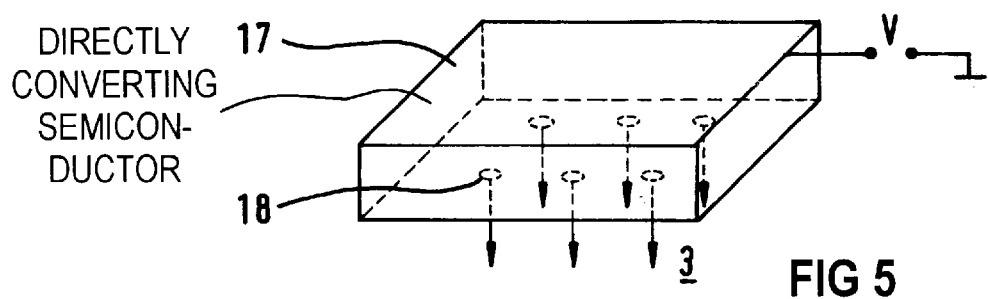

In FIG. 5 a detector 3 is depicted which is composed of a directly converting semiconductor 17 which lies at a bias voltage V. The semiconductor 17 is provided with pixel contacts 18. Multiple pixel contacts 18 are attached to a single semiconductor 17, e.g., of CdTe.

It is principal for the FIGS. 2 to 4 that a scintillator which is no more structured than conventionally is optically coupled to an array of photodiodes.

Through the unsharpness of the scintillator, the signal M is measured for the scintillator instead of the sharp signal (theoretically not measured with an unsharp scintillator):

$$M_i = \sum_j A_{ij} S_j$$

The coupling matrix $A_{ij}$ contains the unsharpness of the system. If the matrix is known and invertible, then S can be reconstructed from the measuring signal M:

$$S_i = \sum_j (A^{-1})_{ij} M_j.$$

I.e., after applying the inverse of matrix A to the measurements $M_j$, a data vector $S_i$ is obtained. This data vector $S_i$ is used to reconstruct an image of the subject in the same manner as a measurement data vector in any conventional CT apparatus (as described, for example, in co-pending U.S. application Ser. No. 08/829,955, filed on Apr. 1, 1997 and assigned to the same Assignee as the present application, the disclosure of which is incorporated herein by reference).

The coupling matrix A is obtainable through the following procedure. The system is irradiated such that only one raster segment (e.g., the $k^{th}$) is struck by X-rays each time ($S_j=\bar{S}$ for j=k, otherwise 0), so that $M_i=A_{ik}$; the measured signal is, then, exactly the $k^{th}$ column of the matrix A. Repeating this procedure for all k, one obtains the complete coupling matrix. A is generally invertible if the scintillator is not too unsharp, i.e., the spread of the point spread function lies in the order of magnitude of the detector raster.

Although modifications and changes may be suggested by those skilled in the art, it is the intention of the inventors to embody within the patent warranted hereon all changes and modifications as reasonably and properly come within the scope of their contribution to the art.

We claim as our invention:

1. An X-ray computed tomography apparatus comprising:
   an X-ray source which emits a fan-shaped radiation beam; and
   a radiation detector disposed in a path of said radiation beam comprising a plurality of individual detector elements, each detector element comprising one X-ray converter in fixed contact with a plurality of signal converters.

2. An X-ray computed tomography apparatus as claimed in claim 1 wherein each individual detector comprises a scintillator in optical contact with a plurality of photosensors.

3. An X-ray computed tomography apparatus as claimed in claim 2 wherein said plurality of photosensors comprises a row of photosensors allocated to each scintillator.

4. An X-ray computed tomography apparatus as claimed in claim 2 wherein said plurality of photosensors comprises a matrix of photosensors allocated to each scintillator.

5. An X-ray computed tomography apparatus as claimed in claim 1 wherein each of said signal converters emits an electrical signal, and said X-ray computed tomography apparatus further comprising means supplied with said electrical signals for identifying an unsharpness associated with each detector element from said electrical signals.

6. An X-ray computed tomography apparatus comprising:
   an X-ray source which emits a fan-shaped X-ray beam; and
   a radiation detector disposed in a path of said X-ray beam comprising a row of detector elements, each detector element representing a single pixel and comprising a block of semiconductor material wherein X-rays incident thereon are directly converted into electrical signals, and each block comprising a plurality of pixel contacts at which different electrical signals, each representing said single pixel, are present.

7. An X-ray computed tomography apparatus as claimed in claim 6 further comprising means supplied with said electrical signals for calculating an unsharpness associated with said block of semiconductor material.

* * * * *